June 2, 1931. F. A. PFEIFER Re. 18,091

CIRCUIT BREAKER AND CLOSER

Original Filed March 16, 1927

Inventor:
Ferdinand A. Pfeifer,
By Wilkinson, Huxley, Byron & Knight
Attys.

Reissued June 2, 1931

Re. 18,091

UNITED STATES PATENT OFFICE

FERDINAND A. PFEIFER, OF SPRINGFIELD, OHIO, ASSIGNOR OF FORTY-NINE PER CENT TO ELLSWORTH CRAIG, OF SPRINGFIELD, OHIO

CIRCUIT BREAKER AND CLOSER

Original No. 1,676,155, dated July 3, 1928, Serial No. 175,684, filed March 16, 1927. Application for reissue filed January 22, 1930. Serial No. 422,666.

This invention relates to circuit breakers and closers and other devices in which it is desirable that a part shall move quickly from one position to another.

One object of the invention is to provide a circuit breaker and closer, or other device of the character above set forth, which will be of a very sensitive character and in which a short movement of the operating mechanism will impart a relatively long movement to the movable member, and in which the movable member will move from one position to another with a quick or snap action.

A further object of the invention is to provide such a device in which a relatively light pressure on the operating mechanism will impart the desired movement to the movable member.

A further object of the invention is to provide such a device which will be simple in its construction, positive in its operation and which can be produced at a low cost.

A further object of the invention is to provide a device which, while sturdily constructed and easily adjusted and operated, is of such character as to be extremely sensitive to small thermal changes.

Other objects of the invention will appear as the apparatus is described in detail.

Figure 1:
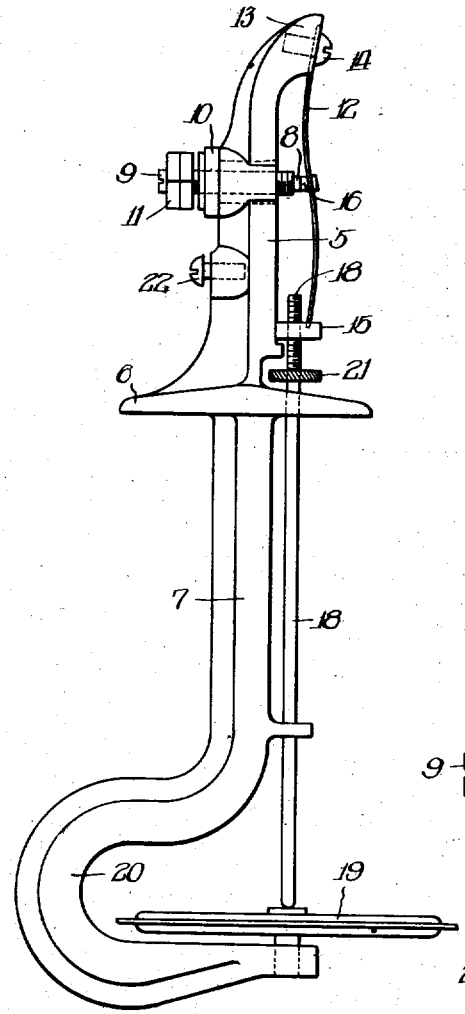
Figure 2:
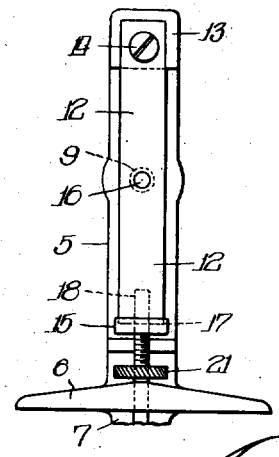
Figure 3:
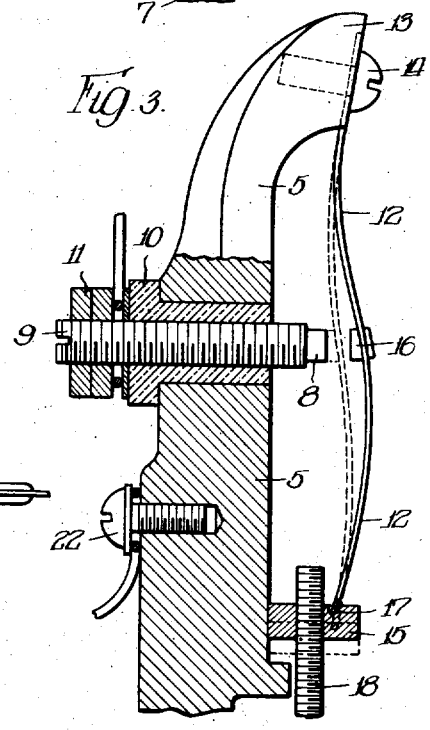

In the accompanying drawings—Fig. 1 is a side elevation of a circuit breaker and closer embodying my invention; Fig. 2 is a front elevation of the upper portion thereof; and Fig. 3 is a sectional view, partly in elevation, of the upper portion of said circuit breaker and closer.

In these drawings I have illustrated one embodiment of my invention and have shown the same as applied to a circuit breaker and closer, but it will be understood that this particular embodiment has been chosen for the purposes of illustration only and that the apparatus may take various forms and may be applied to devices of various kinds without departing from the spirit of the invention.

In the particular embodiment here illustrated the circuit breaker and closer comprises a supporting structure consisting of an upright standard 5 having a base 6 and having depending from said base an arm 7. Carried by the supporting structure is a contact member 8 which is here shown as mounted on the standard 5 between the ends thereof. This contact member is insulated from the supporting structure and, in the present instance, comprises a screw 9 mounted in a bushing 10 carried by the standard 5. The rear end of the screw extends beyond the standard and has mounted thereon a nut 11 so that it constitutes a binding post by means of which the conductor may be connected with the contact member. Carried by the supporting structure and extending transversely to the contact member 8 is an elongated yieldable member of such a character that lengthwise pressure applied to one end thereof will cause the same to move toward and from the stationary contact member and on this yieldable member is mounted the movable contact member. Preferably the yieldable member is of a resilient character and is so mounted and controlled that lengthwise pressure applied to one end thereof will cause the same to buckle or bend in such a manner as to move the intermediate portion thereof toward or from the stationary contact member.

In the present construction, the yieldable member comprises a bar 12 of thin resilient metal, one end of which, in the present instance the upper end, is so secured to the supporting structure that it is held against movement in the direction of the length of the resilient bar. As shown in the drawings, the upper end of the standard extends forwardly, as shown at 13, and the upper end of the resilient bar is rigidly secured to this forwardly extending portion of the standard by a screw 14. The forwardly extending portion 13 of the standard forms a seat for the secured end of the bar 12, said seat being preferably disposed so that it slopes toward the contact member 8. In other words, the bar 12 is directed toward the contact member 8. The lower end of the resilient bar rests upon and is supported by a supporting member 15 which is movable lengthwise of the standard 5. The resilient bar is of such a length with relation to the supporting means therefor that it will be normally supported in a curved position, so that a relatively light pressure on the movable supporting member 15 will increase the curvature of the bar. The movable contact member 16 is connected with and actuated by the resilient bar and is preferably carried thereby and is so arranged that it will be normally held in engagement with the stationary contact member 8 and will be moved out of engagement therewith by the increased curvature of the resilient member which results from an upward movement of the supporting member 15. In the construction here shown the movable contact member comprises a part formed separate from and secured to the resilient member but it would be obvious that it may consist of an integral part of said resilient member. In order that the movable contact member may be held normally in engagement with the stationary contact member the resilient bar is so arranged that it will normally have a double curvature, the upper portion of the bar curving toward the standard, that is, in a direction which will cause it to press the movable contact member toward and against the stationary contact member. The lower portion of the resilient bar is preferably curved in the opposite direction or outwardly from the standard so as to provide an initial bend which will facilitate the operation thereof, but this outward curve is not essential to the operation of the device. This double curve may be secured in any suitable manner but, as here shown, the face of the forwardly projecting part of the standard, to which the resilient bar is secured, is inclined downwardly and toward the body of the standard and the stationary contact member extends forwardly from the standard such a distance that when the movable contact member is in engagement therewith the desired curvature will be imparted to the upper portion of the bar. In initially placing the bar in a double or S curve a quicker opening and closing action of the switch is obtained. In the case of a straight snap switch, such as ordinarily used, when a thermal bar or element as disclosed herein by bar 12 is subjected to thermal changes, it first of all assumes a substantially S shaped curve before snapping from one position to the other. By initially putting such a curve in the bar this initial movement of the switch under operation conditions is dispensed with, thereby providing a more sensitive device. The lower end of the bar is seated in a recess 17 in the supporting member 15, so that it is held in fixed relation thereto and the normal distance between the supporting member 15 and the point of connection of the bar with the standard being less than the length of the bar, the lower portion of the bar will curve outwardly. This normal curvature of the resilient bar may be varied by adjusting the stationary contact member with relation to the standard.

With the arrangement shown and described it will be apparent that a very slight upward movement of the supporting member 15, as shown in Figure 3, will bend or buckle the resilient bar, that is, will increase the outward curvature thereof to such an extent that the movable contact member will be moved away from the stationary contact member a considerable distance and when the upward pressure on the supporting member is relieved the resiliency of the bar will restore the same to its normal position and will again cause the movable contact member to engage the stationary contact member. The character of the bar is such that a very slight movement and a very light pressure on the supporting member will impart the desired movement to the movable contact member. This movement may be imparted to the supporting member in any desired manner and, as here shown, the supporting member is carried by an operating rod 18 which extends downwardly from the base 6 and is connected with the operating mechanism which, in the present instance, consists of a thermostat 19 mounted on the lower portion of the arm 7, which is provided at its lower end with a curved or recessed portion 20 to receive one side of the thermostat. The thermostat here shown comprises a disk-like expansible casing upon which the lower end of the rod 18 rests and the expansion of which will impart vertical movement to the rod and to the supporting member 15. The connection between the supporting member and the operating rod may be adjusted and to this end the upper end of the rod is screw threaded into the supporting member and the rod is provided with a knurled wheel 21 by means of which it may be rotated to effect the adjustment.

The movable contact member may be connected in a circuit in any suitable manner but, in the present construction, the resilient bar is of conducting material and is grounded on the standard and the standard is provided with a binding post or screw 22 by means of which the conductor may be connected therewith.

The operation of the circuit breaker and closer will be readily understood from the foregoing description thereof and it will be apparent that I have provided a very simple highly efficient device which may be produced at a low cost and which will operate positively with a very slight pressure to quickly make and break the circuit and that only a very slight movement of the operating mechanism is necessary to impart a relatively long movement to the movable contact member. The buckling of the resilient actuating device takes place very quickly and causes the movable contact member to snap from one position to the other. Because of the quick and relatively long movement of the movable contact member there will be little or no tendency of the current to arc but the circuit will be positively and quickly broken.

While I have shown and described one embodiment of my invention I wish it to be understood that I do not desire to be limited to the details thereof as various modifications may occur to a person skilled in the art.

Having now fully described my invention, what I claim as new and desire to secure by Letters Patent, is:

1. In a device of the character described, an elongated resilient member, supports for the respective ends of said resilient member, one of said supports being movable toward the other support, said supports being arranged normally to impart a double curve to said resilient member which will tend to move an intermediate portion thereof in a direction transverse to its length, and means for actuating said movable support to so modify the curvature of said resilient member that said intermediate portion thereof will be moved in a direction opposite to the first mentioned movement.

2. In a device of the character described, an elongated resilient member, a fixed support for one end of said resilient member, a support for the other end of said resilient member which is movable toward and from said fixed support, said supports being arranged normally to cause that portion of said resilient member which is adjacent to said fixed support to curve in one direction and to cause that portion of said resilient member which is adjacent to said movable support to curve in the opposite direction, and means for moving said movable support toward said fixed support to increase the curvature of the last mentioned portion of said resilient member and move the intermediate portion thereof quickly from its initial position.

3. In a device of the character described, a normally stationary member, an elongated resilient device having an intermediate portion movable toward and from said stationary member, supports for the respective ends of said resilient device, normally so arranged that one portion of said resilient device will be curved in a direction to press said intermediate portion of said resilient device toward said stationary member and another portion of said resilient device will be curved in a direction opposite that in which the first mentioned portion of said resilient device is curved, the last mentioned support being movable toward the first mentioned support to so modify the curvature of said resilient device as to cause said intermediate portion thereof to be moved from said stationary member.

4. In a device of the character described, a normally stationary member, an elongated resilient device having an intermediate portion movable toward and from said stationary member, supports for the respective ends of said resilient device, normally so arranged that one portion of said resilient device will be curved in a direction to press said intermediate portion of said resilient device toward said stationary member and another portion of said resilient device will be curved in a direction opposite that in which the first mentioned portion of said resilient device is curved, the last mentioned support being movable toward the first mentioned support to so modify the curvature of said resilient device as to cause said intermediate portion thereof to be moved from said stationary member, and said normally stationary member being adjustable to vary the initial curvature of said resilient device.

5. In a device of the character described, a structure having supports spaced one from the other, one of said supports being movable toward the other support, a resilient member mounted on said supports, a contact member carried by said structure between said supports, said supports being normally arranged to impart a double curve to said resilient member and to cause an intermediate portion thereof to be pressed toward said contact member, and means to move said movable support toward the other support and to so modify the curvature of said resilient member as to cause said intermediate portion thereof to be moved quickly from said contact member.

6. In a device of the character described, a fixed support, a support spaced from and movable toward said fixed support, a contact member arranged between said supports, a resilient member having one end secured to said fixed support and inclined toward said contact member and having its other end connected with said movable support, said movable support being arranged normally to cause that portion of said resilient member adjacent thereto to curve outwardly from said contact member, and means for actuating said movable support to increase said curvature and move the intermediate portion of said resilient member from said contact member.

7. In a device of the character described, a fixed support, a movable support spaced from said fixed support, a contact member arranged between said supports, a resilient member having one end secured to said fixed support and inclined toward said contact member to press an intermediate part of said resilient member against said contact member, and having its other end connected with said movable support, and means for actuating said movable support to curve that portion of said resilient member adjacent thereto away from said contact member, thereby imparting a double curvature to said resilient member and moving said intermediate part away from said contact member.

8. In a device of the character described, an elongated resilient member, a fixed support for one end of said resilient member, a movable support for the other end of said resilient member, said supports being arranged normally to cause that portion of said resilient member which is adjacent to said fixed support to curve in one direction, and means for moving said movable support toward said fixed support to cause that portion of said resilient member which is adjacent to said movable support to curve in a direction opposite to the curvature of said resilient member and to move the intermediate portion of said resilient member from its initial position with a snap action.

9. In a device of the character described, a fixed support, a movable support spaced from said fixed support, a normally fixed contact member arranged between said supports, a resilient member secured to said fixed support and engaging said movable support, said fixed support and said contact member being so arranged that that portion of said resilient member which lies between the same will be curved in a direction to press the intermediate portion of said resilient member toward said contact member, and means for actuating said movable support to cause that portion of said resilient member adjacent to the same to curve in a direction opposite the curvature of the first mentioned portion of said resilient member to move said intermediate portion of said resilient member away from said contact member.

10. In a device of the character described, a fixed support, a movable support spaced from said fixed support, a contact member arranged between said supports, an elongated resilient member connected at its ends with the respective supports and having an intermediate part movable into and out of engagement with said contact member, said supports and said contact member being so arranged with that portion of said resilient member extending between said contact member and said fixed support will at all times be curved in the direction of said contact member, and means for actuating the movable support to cause that portion of said resilient member adjacent to said movable support to be curved in a direction away from said contact member and thereby impart a quick movement to said intermediate part of said resilient member.

11. In a device of the character described, a standard having at one end a forwardly extending part a support mounted near the other end of said standard for movement lengthwise thereof, a member carried by said standard between the ends thereof and projecting inwardly therefrom, a resilient bar rigidly secured at one end to the forwardly extending part of said standard and supported at its other end by said movable support, said movable support being normally so arranged with relation to said part of said standard that a double curve will be imparted to said resilient bar and the movement of said movable support will modify the curvature of said resilient bar and cause the intermediate portion thereof to move with relation to said member.

12. In a device of the character described, a supporting structure comprising a base, a standard carried by said base and having at its outer end a forwardly extending part forming a support, an arm depending from said base, a thermostat carried by said arm, a part mounted for movement with relation to said standard, connected with said thermostat and having a part forming a support, a contact member carried by said standard between said supports, and a resilient bar secured at one end to said forwardly extending part of said standard and supported at its other end on said movable support, said movable support being normally so arranged with relation to said forwardly extending part of said standard that a double curve will be imparted to said resilient bar and the movement of said movable support will modify the curvature of said bar and cause the intermediate portion thereof to move with relation to said contact member.

13. In a circuit breaker, the combination of a contact member, a conducting member mounted adjacent said contact member cooperating therewith to normally establish communication with said contact member whereby current may be transferred from one member to the other, the contact between said contact member and said conducting member being on the dead center of said conducting member, said conducting member having portions disposed on each side of said dead center whereby thermal changes will cause the initial movement of said conducting member away from said contact member.

14. In a circuit breaker, the combination of a contact, a conducting member mounted adjacent said contact and adapted to cooperate with said contact whereby current may be selectively transferred from one to the other, supports for said conducting member confining a portion thereof whereby a dead center is defined by the point of cooperation of said conducting member and said contact, and the points of confining of said conducting member, portions of said conducting member being disposed on each side of said dead center.

15. In a circuit breaker, the combination of a contact member, supports disposed on each side of said contact member, a conducting element flexed to a compound shape between said supports for electrical cooperation with said contact member at the dead center defined by said shape, one of said supports being disposed to normally direct said conducting element toward said contact member.

16. In a circuit breaker, the combination of a contact member, supports disposed on each side of said contact member, a conducting element disposed between said supports for electrical cooperation with said contact member, one of said supports being disposed to normally direct said conducting element toward said contact member, one of said supports being movable whereby said conducting element may be set so that a condition change affecting said element will immediately break cooperative relation between said contact member and said conducting element.

17. In a circuit breaker, the combination of a contact member, supports disposed on each side of said contact member, a conducting element disposed between said supports for electrical cooperation with said contact member, one of said supports being disposed to normally direct said conducting element toward said contact member, one of said supports being movable whereby the levels of the portions of said element between said supports and said contact may be varied.

18. In a circuit breaker, the combination of a contact member, a conducting element disposed adjacent thereto and having a contact member thereon adapted to have cooperative relation with said first named contact member, said conducting element being disposed in a compound curved shape, said second named contact member being substantially at the dead center thereof, whereby any movement of said conducting element breaks engagement between said contact members.

19. In a circuit breaker, the combination of a contact member, a conducting member mounted adjacent said contact member and adapted to establish communication with said contact member whereby current may be transferred from one member to the other, the point on said conducting member determining the contact between said conducting member and said contact member being on the dead center of said conducting member, said point on the dead center being moved by initial movement of said conducting member to cause relative movement between said conducting member and said contact member.

20. In a circuit breaker, the combination of a contact member, a conducting element disposed adjacent thereto and having a contact member thereon adapted to have cooperative relation with said first named contact member, said conducting element being disposed in a compound curved shape, said second named contact member being substantially at the dead center thereof, whereby any movement of said conducting element moves said second named contact member with respect to said first named contact member.

FERDINAND A. PFEIFER.